United States Patent
Oh (10) Patent No.: US 12,476,809 B2
(45) Date of Patent: Nov. 18, 2025

(54) METHOD OF ENCRYPTION BASED ON IDENTIFICATION USING PEDERSEN COMMITMENT AND METHOD OF DECRYPTION CORRESPONDING THE SAME

(71) Applicant: Zkrypto Inc., Seoul (KR)

(72) Inventor: Hyunok Oh, Seoul (KR)

(73) Assignee: Zkrypto Inc., Seoul (KR)

( * ) Notice: Subject to any disclaimer, the term of this patent is extended or adjusted under 35 U.S.C. 154(b) by 114 days.

(21) Appl. No.: 18/540,906

(22) Filed: Dec. 15, 2023

(65) Prior Publication Data

US 2025/0202700 A1  Jun. 19, 2025

(51) Int. Cl.
*H04L 9/30* (2006.01)
*H04L 9/14* (2006.01)

(52) U.S. Cl.
CPC .............. *H04L 9/3093* (2013.01); *H04L 9/14* (2013.01)

(58) Field of Classification Search
USPC .......................................................... 380/30
See application file for complete search history.

(56) References Cited

U.S. PATENT DOCUMENTS

| | | | |
|---|---|---|---|
| 11,438,137 B2 * | 9/2022 | Naito | H04L 9/06 |
| 2010/0272260 A1 * | 10/2010 | Cao | H04H 60/15 380/46 |
| 2022/0086003 A1 * | 3/2022 | Mukherjee | H04L 9/3242 |

FOREIGN PATENT DOCUMENTS

KR 101332687 B1 * 12/2013 .......... H04L 9/0643

OTHER PUBLICATIONS

Jan Camenisch et al., Rethinking accountable privacy supporting services, Digital Identity Management, Oct. 31, 2008 (Year: 2008).*
EPO, European Search Report issued for European Patent Application No. 23220059.2-1218, Jun. 10, 2024.
Trevor Conley et al., Instant Zero Knowledge Proof of Reserve, IACR, International Association for Cryptologic Research, Dec. 17, 2023.
Gweonho Jeong et al., Azeroth: Auditable Zero-knowledge Transactions in Smart Contracts, IACR, International Association for Cryptologic Research, May 31, 2022.
Jan Camenisch et al., Rethinking accountable privacy supporting services, Digital Identity Management, Oct. 31, 2008.

* cited by examiner

*Primary Examiner* — Sanchit K Sarker
(74) *Attorney, Agent, or Firm* — Nicholas Park (57) ABSTRACT

The present invention is an encryption method based on identification using a Pedersen commitment and a decryption method corresponding to the same. An encryption method of a message based on identification, performed by at least one processor, includes steps of receiving a public parameter and a public key, randomly determining an encryption constant, parsing a plurality of parameters from the public parameter, calculating a first cypher text and a second cypher text by using the plurality of parameters, the encryption constant, and the message, parsing an ID value including a plurality of bits from the public key, calculating a third cypher text by using the ID value, and outputting the first cypher text, the second cypher text, and the third cypher text. At least one of the first cypher text, the second cypher text, and the third cypher text has a Pedersen commitment format.

5 Claims, 13 Drawing Sheets

FIG. 3B $\underline{\Pi_{\mathsf{ccIBE}}.\mathsf{Setup}(1^\lambda) \to (\mathsf{pp}, \mathsf{mk})}$ $(g, h) \xleftarrow{\$} \mathbb{G}_1 \times \mathbb{G}_2$ $\alpha, \beta, \gamma \xleftarrow{\$} \mathbb{F}$ $g_1 \leftarrow g^\alpha, g_2 \leftarrow g^{\alpha\beta}$ $h_1 \leftarrow h^\alpha$ $\boldsymbol{u} = \{u_i\}_{i=1}^n \xleftarrow{\$} \mathbb{F}^n$ $\bar{u} \leftarrow g^\gamma, \bar{v} \leftarrow h^\gamma$ $\boldsymbol{U} \leftarrow g^{\boldsymbol{u}} \in \mathbb{G}_1^n, \boldsymbol{V} \leftarrow h^{\boldsymbol{u}} \in \mathbb{G}_2^n$ $\mathsf{pp} := (g, h, g_1, g_2, \bar{u}, \boldsymbol{U}, \bar{v}, \boldsymbol{V})$ $\mathsf{mk} := h_1^\beta$

Return $(\mathsf{pp}, \mathsf{mk})$

FIG. 4A

FIG. 4B $\Pi_{ccIBE}.\mathsf{KeyGen}(1^\lambda, \mathsf{pp}, \mathsf{id}, \mathsf{mk}) \to (\mathsf{ck}, \mathsf{pk}, \mathsf{sk})$ parse pp as $(g, h, g_1, g_2, \vec{u}, \boldsymbol{U}, \vec{v}, \boldsymbol{V})$ parse id as $(\mathsf{id}_1, \ldots, \mathsf{id}_n)$ $r \xleftarrow{\$} \mathbb{F}$ $X \leftarrow \vec{u} \cdot \prod_{i \in S} U_i, \quad W \leftarrow \vec{v} \cdot \prod_{i \in S} V_i$ // $S := \forall i: \mathsf{id}_i = 1$ $\mathsf{ck} := (g, g_1, g_2, W)$ $\mathsf{pk} := \mathsf{id}$ $\mathsf{sk} := (h^r, \mathsf{mk} \cdot W^r)$

Return $(\mathsf{ck}, \mathsf{pk}, \mathsf{sk})$

FIG. 5A

FIG. 5B $\Pi_{cdBE}.\mathsf{Enc}(\mathsf{pp},\mathsf{pk},m) \to (\mathsf{ct};t)$

--- parse pp as $(g, h, g_1, g_2, \bar{u}, U, \bar{v}, V)$
parse pk as $(\mathsf{id}_1, \ldots, \mathsf{id}_n)$
$t \xleftarrow{\$} \mathbb{F}$
$\mathsf{ct}_1 \leftarrow g_2^t \cdot g_1^m$, $\mathsf{ct}_2 \leftarrow g^t$
$\mathsf{ct}_3 \leftarrow \left(\bar{u} \cdot \sum_{i \in S} U_i\right)^t$ // $S := \forall i: \mathsf{id}_i = 1$
$\mathsf{ct} := (\mathsf{ct}_1, \mathsf{ct}_2, \mathsf{ct}_3)$
Return $(\mathsf{ct}; t)$

FIG. 6A

FIG. 6B $\Pi_{ccIBE}.\text{Dec}(pp, sk, ct) \to m$ parse pp as $(g, h, g_1, g_2, \vec{u}, U, \vec{v}, V)$
parse sk as $(sk_1, sk_2)$
parse ct as $(ct_1, ct_2, ct_3)$ $$e(ct_1, h) \cdot \frac{e(ct_3, sk_1)}{e(ct_2, sk_2)} = e(g_1, h)^m$$

// Compute a discrete log to obtain $m$
Return $m$

FIG. 7A

FIG. 7B $\Pi_{\text{ccIBE}}.\text{VerEnc}(ck, ct, t, m) \to \text{true/false}$ parse ck as $(ck_1, ck_2, ck_3, ck_4)$
parse ct as $(ct_1, ct_2, ct_3)$
return $ct_1 \stackrel{?}{=} ck_3^t \cdot ck_2^m \wedge ct_2 \stackrel{?}{=} ck_1^t \wedge ct_3 \stackrel{?}{=} ck_4^t$

FIG. 8

METHOD OF ENCRYPTION BASED ON IDENTIFICATION USING PEDERSEN COMMITMENT AND METHOD OF DECRYPTION CORRESPONDING THE SAME

BACKGROUND

Technical Field

The present invention relates to an encryption method based on identification using a Pedersen commitment and a method of decryption corresponding the same

Background Art

A zero-knowledge proof is often used to provide verifiability in blockchain systems that guarantee privacy or cloud systems that delegate calculations. As the zero-knowledge proof algorithm, zero-knowledge Succinct Non-interactive ARguments of Knowledge (zk-SNARK) is commonly used. The zk-SNARK may prove the fact that an operation on an arbitrary circuit is correctly performed without disclosing secret information used in the circuit. By application, there are many cases that encryption technologies in the circuit is included. In these cases, most of the encryption technologies necessarily include complex cryptographic operation and accordingly increase the size of a circuit. Since a proof generation time of the zk-SNARK is linearly proportional to a size of a circuit, practicality of the zk-SNARK is lowered as an operation in encryption is complicated, and accordingly efforts for shortening the proof generation time have been continuously made.

SUMMARY

Technical Problem

An object of the present invention is to provide a method of performing encryption based on identification using a Pedersen commitment.

Another object of the present invention is to provide a method of decrypting an encrypted cypher text based on identification using a Pedersen commitment.

Technical Solution

An encryption method of a message based on an identification, which is performed by at least one processor, according to an embodiment of the present invention may include the steps of: receiving a public parameter and a public key; randomly determining an encryption constant; parsing a plurality of parameters from the public parameter; calculating a first cypher text and a second cypher text by using the plurality of parameters, the encryption constant, and the message; parsing an identification (ID) value including a plurality of bits from the public key; calculating a third cypher text by using the ID value; and outputting the first cypher text, the second cypher text, and the third cypher text. At least one of the first cypher text, the second cypher text, and the third cypher text has a Pedersen commitment format.

According to an embodiment, the calculating of the first cypher text and the second cypher text may include determining, among the plurality of parameters, a value obtained by multiplying a value of a first parameter exponentiated by the message and a value of a second parameter exponentiated by the encryption constant as the first cypher text.

According to an embodiment, when the first parameter is $g_1$, the second parameter is $g_2$, the message is m, and the encryption constant is t, the first cypher text $ct_1$ may be determined by the following equation.

$$ct_1 = g_1^m \cdot g_2^t$$

According to an embodiment, the calculating of the first cypher text and the second cypher text may include determining, among the plurality of parameters, a value of a first commit value exponentiated by the encryption constant as the second cypher text.

According to an embodiment, when the first commit value is g and the encryption constant is t, the second cypher text $ct_2$ may be determined by the following equation.

$$ct_2 = g^t$$

According to an embodiment, the calculating of the third cypher text may include parsing a third parameter and a parameter vector from the public parameter; obtaining an index set including indexes corresponding to a first bit value among a plurality of bits of the ID value; and calculating the third cypher text by using elements corresponding to the index set among elements included in the parameter vector and the third parameter.

According to an embodiment, when the third parameter is $\bar{u}$, the parameter vector is U, the index set is S, and an encryption constant is t, the third cypher text $ct_3$ may be determined by the following equation.

$$ct_3 = \left(\bar{u} \cdot \sum_{i \in S} U_i\right)^t$$

According to an embodiment of the present invention, a decryption method for an encrypted message based on identification performed by at least one processor may include the steps of receiving a public parameter, a first cypher text, a second cypher text, and a third cypher text; parsing a first commit value and a second commit value from the public parameter; obtaining a first secret key and a second secret key; obtaining a first pairing value from the first cypher text and the second commit value by using a pairing function; obtaining a second pairing value from the second cypher text and the second secret key by using a pairing function; obtaining a third pairing value from the third cypher text and the first secret key by using a pairing function; obtaining a decryption text through an operation on the first pairing value, the second pairing value, and the third pairing value; and decrypting a message from the decryption text by using a first parameter and the second commit value obtained from the public parameter.

According to an embodiment, the decrypting the message may include obtaining a fourth pairing value from a second parameter and the first commit value by using a pairing function; and determining an exponent value capable of achieving the decryption text through exponentiation of the fourth pairing value as the message.

According to an embodiment, the obtaining of the decryption text may include obtaining the decryption text by multiplying the first pairing value by the third pairing value and dividing by the second pairing value.

According to an embodiment, the third cypher text may be configured in exponentiation of the first commit value.

According to an embodiment, the first secret key and the second secret key may be configured in exponentiation of the second commit value.

When a second commit key is h, a first constant is α, a second constant is β, a third constant is γ, a parameter vector is u, an index set is S, and a random constant is r, then the first secret key $sk_1$ and the second secret key $sk_2$ may be determined by the following equation.

$$sk_1 = h^r$$

$$sk_2 = h^{\alpha\beta} \cdot h^{r\gamma \cdot \prod_{i \in S} u_i}$$

DETAILED DESCRIPTION

Hereinafter, exemplary embodiments of the present disclosure will be described in detail with reference to the accompanying drawings. Advantages and features of the present invention and methods of achieving the same will become apparent with reference to embodiments described in detail below together with the accompanying drawings. However, the technical spirit of the present invention is not limited to the following embodiments, but may be implemented in various different forms, and the following embodiments are provided to complete the technical spirit of the present invention and to completely inform a person having ordinary skill in the art to which the present invention belongs of the scope of the present invention, and the technical spirit of the present invention is only defined by the scope of Claims.

In adding reference numerals to elements in each drawing, it should be noted that the same elements will be designated by the same reference numerals, if possible, although they are shown in different drawings. In addition, in describing the present invention, when it is determined that a detailed description of related known features or functions may obscure the gist of the present invention, the detailed description thereof will be omitted.

Unless otherwise defined, all terms (including technical and scientific terms) used herein have the same meaning as commonly understood by one of ordinary skill in the art to which the inventive concept belongs. In addition, terms defined in commonly used dictionaries are not interpreted ideally or excessively unless they are clearly specifically defined. The terminology used herein is for the purpose of describing embodiments and is not intended to be limiting of the present invention. In the specification, a singular form includes a plural form unless specifically mentioned in the text.

In addition, in describing the feature element of the present invention, terms such as first, second, A, B, (a), (b), and the like may be used. The term is used only to distinguish the feature element from other feature elements, and the nature, sequence, or order of the corresponding feature element is not limited by the term. When a feature element is described as being "connected," "coupled," or "connected" to another element, the feature element may be directly connected or connected to the other element, but it should be understood that another feature element may be "connected," "coupled," or "connected" between each feature element.

It will be further understood that the terms "comprises" and/or "comprising" used in the present invention do not preclude the presence or addition of one or more other feature elements, steps, operations, and/or elements in the presence of stated feature elements, steps, operations, and/or elements.

A component included in any one embodiment and a feature element including a common function may be described using the same name in another embodiment. Unless otherwise stated, the description described in any one embodiment may be applied to other embodiments, and a detailed description may be omitted within a redundant range or a range that can be clearly understood by a skilled person in the art in the art.

Hereinafter, some embodiments of the present invention will be described in detail with reference to the accompanying drawings.

Hereinafter, the present invention will be described in detail with reference to preferred embodiments of the present invention and the accompanying drawings.

Figure 1:
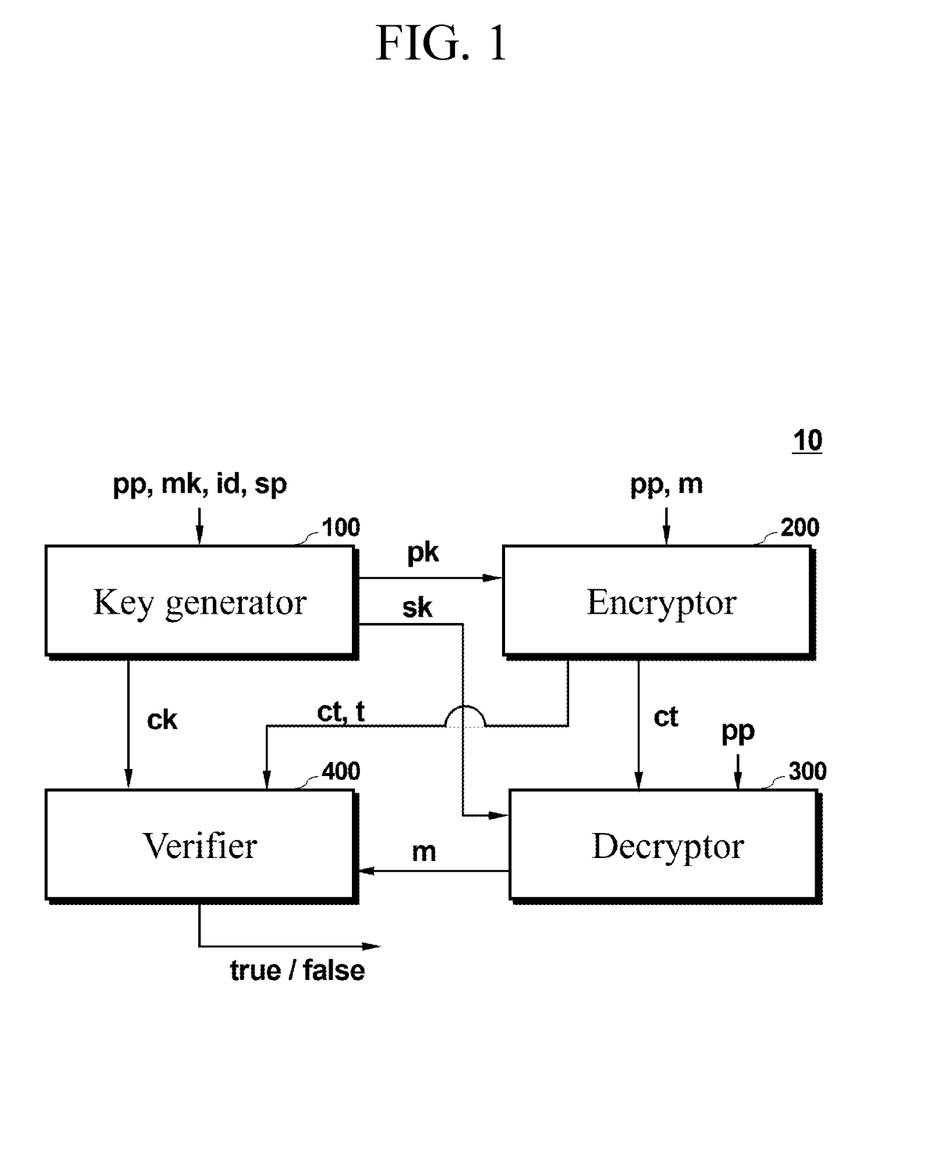
FIG. 1 is a block diagram illustrating a system according to an example embodiment.

FIG. 1 is a block diagram illustrating a system according to an example embodiment.

Referring to FIG. 1, a system 10 is a system for encrypting, decrypting, and verifying a message m, and components included in the system 10 may be configured by a plurality of terminals. In an example, a key generator 100, an encryptor 200, a decryptor 300, and a verifier 400 may each be configured as at least one terminal, and the at least one terminal may include various communication terminal devices such as a cellular phone, a smart phone, a laptop, a personal computer (PC), a navigation, a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband Internet (Wibro) terminal, a smart pad, a tablet PC (TABLET), and the like. In another example, each of the key generator 100, the encryptor 200, the decryptor 300, and the verifier 400 may be implemented as a server.

The key generator 100, the encryptor 200, the decryptor 300, and the verifier 400 may be connected to each other through a network capable of communicating with each other in a wired or wireless manner, and when they are connected to each other in a wired manner, the network may use a serial method, and when they are connected to each other in a wireless manner, the network may communicate with each other using a wireless communication network. The wireless communication network includes, but is not limited to, a Local Area Network (LAN), a Wide Area Network (WAN), the World Wide Web (WWW), a wired/wireless data communication network, a telephone network, a wired/wireless television communication network, 3G, 4G, 5G, 3rd Generation Partnership Project (3GPP), 5th Generation Partnership Project (5GPP), Long Term Evolution (LTE), World Interoperability for Microwave Access (WIMAX), Wi-Fi, the Internet, a Local Area Network (LAN), a Wireless Local Area Network (Wireless LAN), a Wide Area Network (WAN), a Personal Area Network (PAN), a Radio Frequency (RF), a Bluetooth network, a Near-Field Communication (NFC) network, a satellite broadcasting network, an analog broadcast network, a Digital Multimedia Broadcasting (DMB) network, a Chain Network, and the like.

The key generator 100 may generate a plurality of keys ck, sk, and pk for encrypting and decrypting the message m. For this purpose, the key generator 100 may be operated by an certified authority (for example, an authenticator certified by the government.) In an embodiment, the key generator 100 may generate a plurality of keys ck, sk, and pk based on the public parameter pp, the master key mk, the identification (ID) value, and the security parameter sp. The public parameter pp may indicate parameters that are previously set to perform the encryption and decryption methods according to an exemplary embodiment of the inventive concept, and will be described in detail later with reference to FIGS. 3A and 3B. The master key mk may represent a key that is previously set to generate the secret key sk, as will be described in detail later in FIGS. 3A and 3B. The ID value id may indicate a value corresponding to an identification of the key generator 100 or an entity for which a key is to be generated, and may include a plurality of bits. The security parameter sp may indicate an encryption level, and may indicate an encryption length such as 128 bits, 256 bits, or 512 bits in one example.

The key generator 100 may transmit the generated keys ck, sk, and pk to each feature of the system 10. In an embodiment, the key generator 100 may generate a public key pk based on the ID value id and transmit the generated public key pk to the encryptor 200. In an embodiment, the key generator 100 may generate a secret key sk based on the master key mk and at least one parameter, and transmit the generated secret key sk to the decryptor 300. In an embodiment, the key generator 100 may generate a commit key ck based on at least one parameter and the ID value id, and transmit the generated commit key ck to the verifier 400. The key generation operation of the key generator 100 will be described in detail later with reference to FIGS. 4A and 4B.

According to an exemplary embodiment of the present disclosure, the key generator 100 may generate the ID value id, which is the identification information of the user, as the public key pk, and use the identification information of the user as the public key pk instead of a separate generation algorithm for the public key pk, thereby improving convenience for the encryption algorithm.

The encryptor 200 may receive the public key pk, and generate the cypher text ct by encrypting the message m using the public parameter pp and the public key pk. In one example, the encryptor 200 may be operated by a user for encrypting and transmitting a message. In an embodiment, the encryptor 200 may generate at least one cypher text ct by randomly determining the encryption constant t and encrypting the message m based on the public parameter pp and the ID value id which is the public key pk. An encryption operation of the encryptor 200 will be described in detail later with reference to FIGS. 5A and 5B.

The decryptor 300 may receive the secret key sk and the cypher text ct, and may derive the message m by decrypting the cypher text ct based on the secret key sk and the public parameter pp. In one example, the decryptor 300 may be operated by a user to decrypt and identify a message. The decryption operation of the decryptor 300 will be described in detail later with reference to FIGS. 6A and 6B.

The verifier 400 may receive the message m and the cypher text ct, and verify whether the cypher text ct is encrypted using the commit key ck in a proper method. In one example, the verifier 400 may be operated by a verification authority that checks the legitimacy for the cypher text ct. In an embodiment, the verifier 400 may verify the cypher text ct by proving the cypher text ct by a zero-knowledge proof method. In the present specification, the zero-knowledge proof method is a verification method of the integrity of a message without checking the message (e.g., cypher text ct), and in an example, a zero-knowledge SNARK (zk-SNARK) and a commit carrying SNARK (cc-SNARK) may be used as the zero-knowledge proof method. A verification operation of the verifier 400 will be described in detail later with reference to FIGS. 7A and 7B.

In an embodiment, the commit key ck may be generated in a Pedersen commitment format. According to an embodiment of the present disclosure, as the commit key ck follows the Pedersen commitment format, the zero-knowledge proof based on the CC-SNARK algorithm may be performed on the cypher text ct, and as the CC-SNARK, which is a high-speed zero-knowledge proof algorithm, is used, the zero-knowledge proof on the cypher text ct may be performed at a fast time.

Although not shown, the system 10 may further include a terminal for setup the public parameter pp and the master key mk. This will be described in detail later with reference to FIGS. 3A and 3B.

In this specification, the operation of the system 10 and each feature included in the system 10 may mean an operation performed by a processor included in each feature, based on a computer program including at least one instruction stored in a storage device included in each feature, and the storage device may include a non-volatile memory, a volatile memory, a flash memory, a hard disk drive (HDD), a solid state drive (SSD), or the like. The processor may include at least one of a Central Processing Unit (CPU), a Graphic Processing Unit (GPU), a Neural Processing Unit (NPU), a RAM, a ROM, a system bus, and an application processor.

Figure 2:
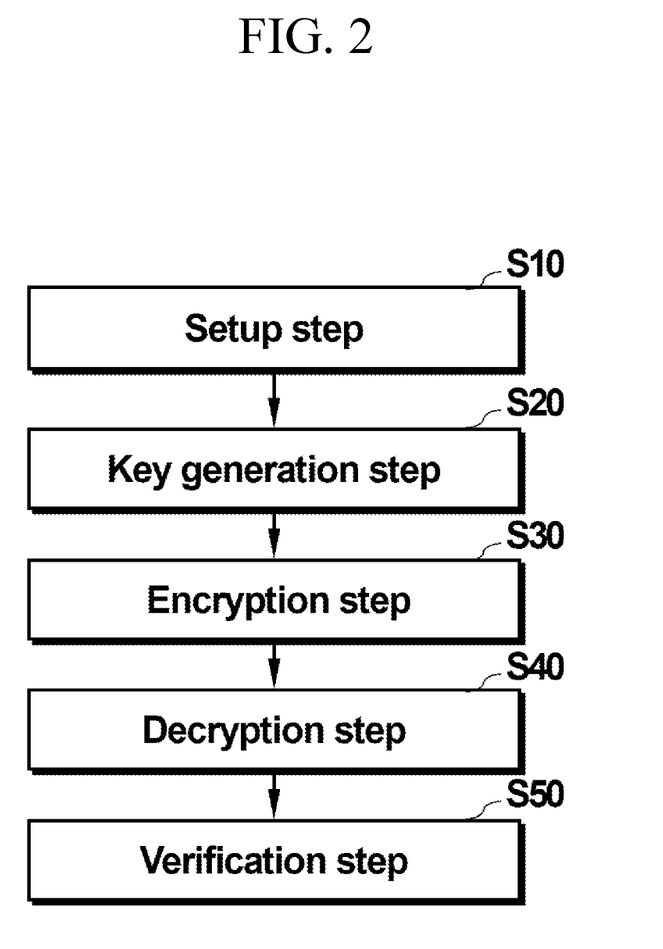
FIG. 2 is a flowchart of an operation method of a system, according to an example embodiment.

FIG. 2 is a flowchart of an operation method of a system, according to an example embodiment.

Referring to FIG. 2, elements necessary for encryption, such as a public parameter pp and a master key mk, may be determined in the setup step S10. The setup step S10 may be performed in advance before encryption, may be performed by a certified authenticator, and the public parameter pp and the master key mk generated in the setup step S10 may be announced to be accessible by a plurality of entities.

In the key generation step S20, a plurality of keys using the public parameter pp and the master key mk may be generated. In an embodiment, the identification of the user may be utilized for key generation.

In the encryption step S30, the cypher text ct may be generated as encryption of the message m is performed using the public key pk among the generated keys.

In the decryption step S40, the message m may be derived by decrypting the cypher text ct using the secret key sk among the generated keys.

In the verification step S50, the cypher text ct may be verified using the commit key ck among the generated keys.

Figure 3A:
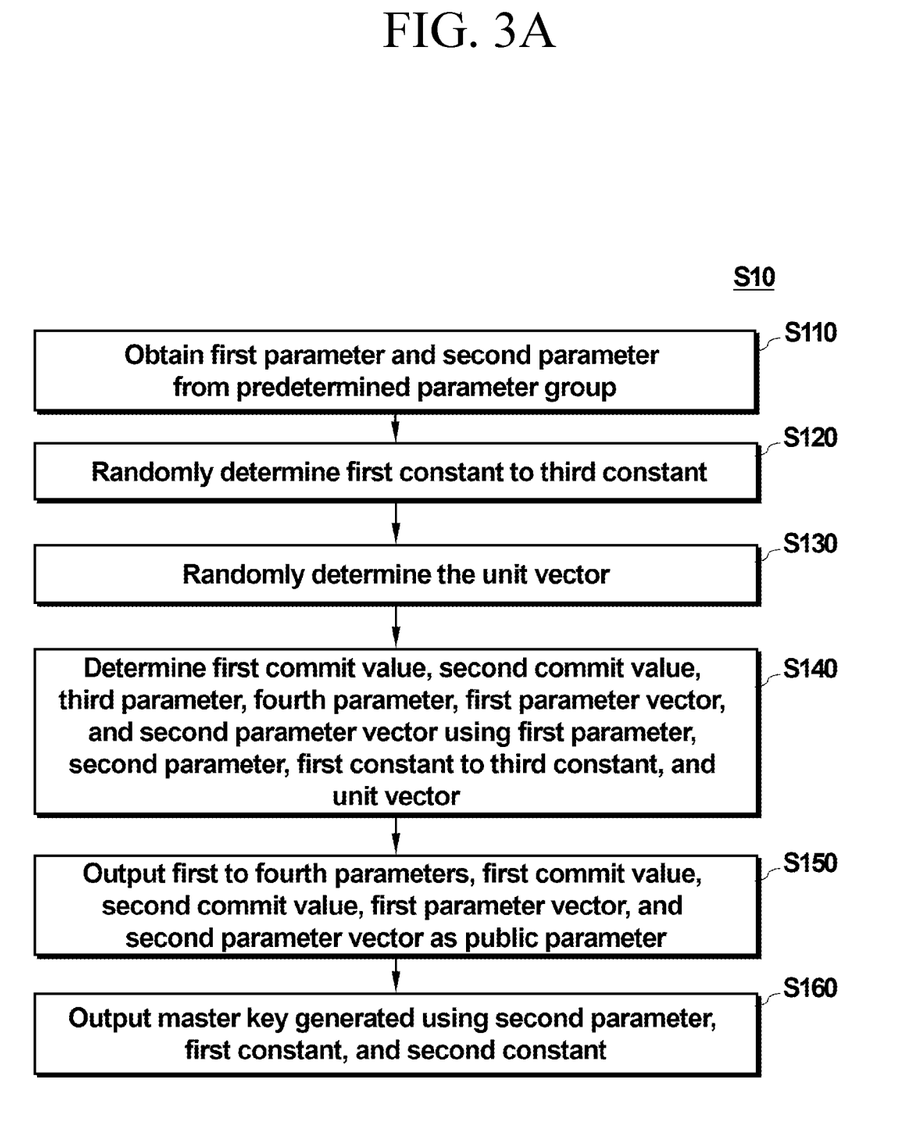
FIG. 3A is a flowchart illustrating a setup step according to an example embodiment.
Figure 3B:
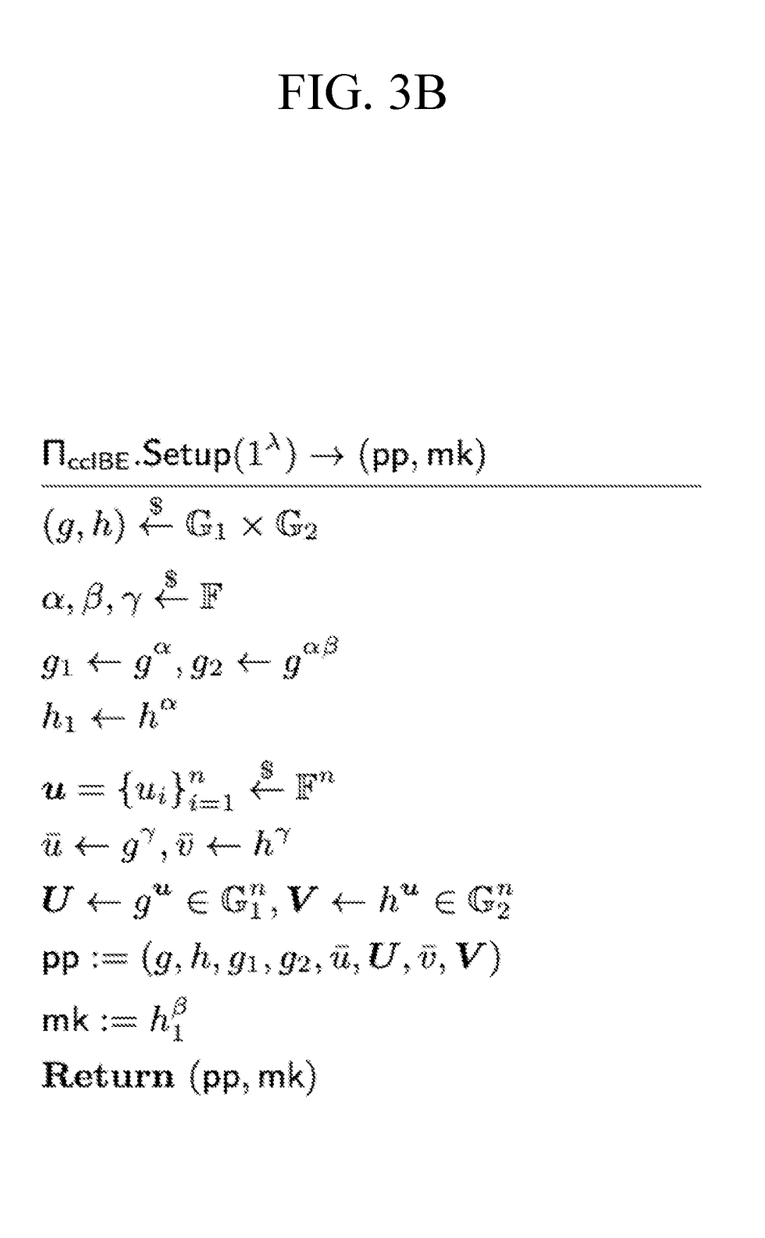
FIG. 3B is a diagram illustrating a setup algorithm according to an example embodiment.

FIG. 3A is a flowchart illustrating a setup step S10 according to an example embodiment, and FIG. 3B is a diagram illustrating a setup algorithm according to an example embodiment.

Referring to FIGS. 3A and 3B, the system 10 may obtain a first parameter g and a second parameter h from a predetermined parameter group G1, G2, step S110. Also, the system 10 may randomly determine the first constant α, the second constant β, and the third constant γ, step S120. In addition, the system 10 may randomly determine the unit vector u, step S130.

The system 10 may determine a first commit value $g_1$, a second commit value $g_2$, a third parameter $\bar{u}$, a fourth parameter $\underline{v}$, a first parameter vector U, and a second parameter vector V using the first parameter g, the second parameter h, the first constant α to the third constant γ, and the unit vector u, step S140. In some example embodiments, as illustrated in FIG. 3B, the first commit value $g_1$ may be determined as the first parameter g exponentiated by the first constant α, the second commit value $g_2$ may be determined as the first parameter g exponentiated by the first constant α and the second constant β, the third parameter $\bar{u}$ may be determined as the first parameter g exponentiated by third constant γ, and the fourth parameter $\bar{v}$ may be determined as the second parameter h exponentiated by the third constant γ. In addition, the first parameter vector U may be determined as the first parameter g exponentiated by the unit vector u, and the second parameter vector V may be determined as the second parameter h exponentiated by the unit vector u.

The system 10 may output the determined first to fourth parameters g to v, the first commit value $g_1$, the second commit value $g_2$, the first parameter vector U, and the second parameter vector V as the public parameter pp, step S150.

Also, the system 10 may output a master key mk generated using the second parameter h, the first constant α, and the second constant β, step S160. In one example, the system 10 may determine the second parameter h exponentiated by the first constant α and the second constant β as the master key mk.

According to an embodiment of the present disclosure, at least some of the public parameter pp and the master key mk may be configured in a Pedersen commitment format of an exponentiation, and accordingly, a high-speed zero-knowledge proof algorithm may be utilized in a verification process, and therefore, the verification process may be rapidly performed.

Figure 4A:
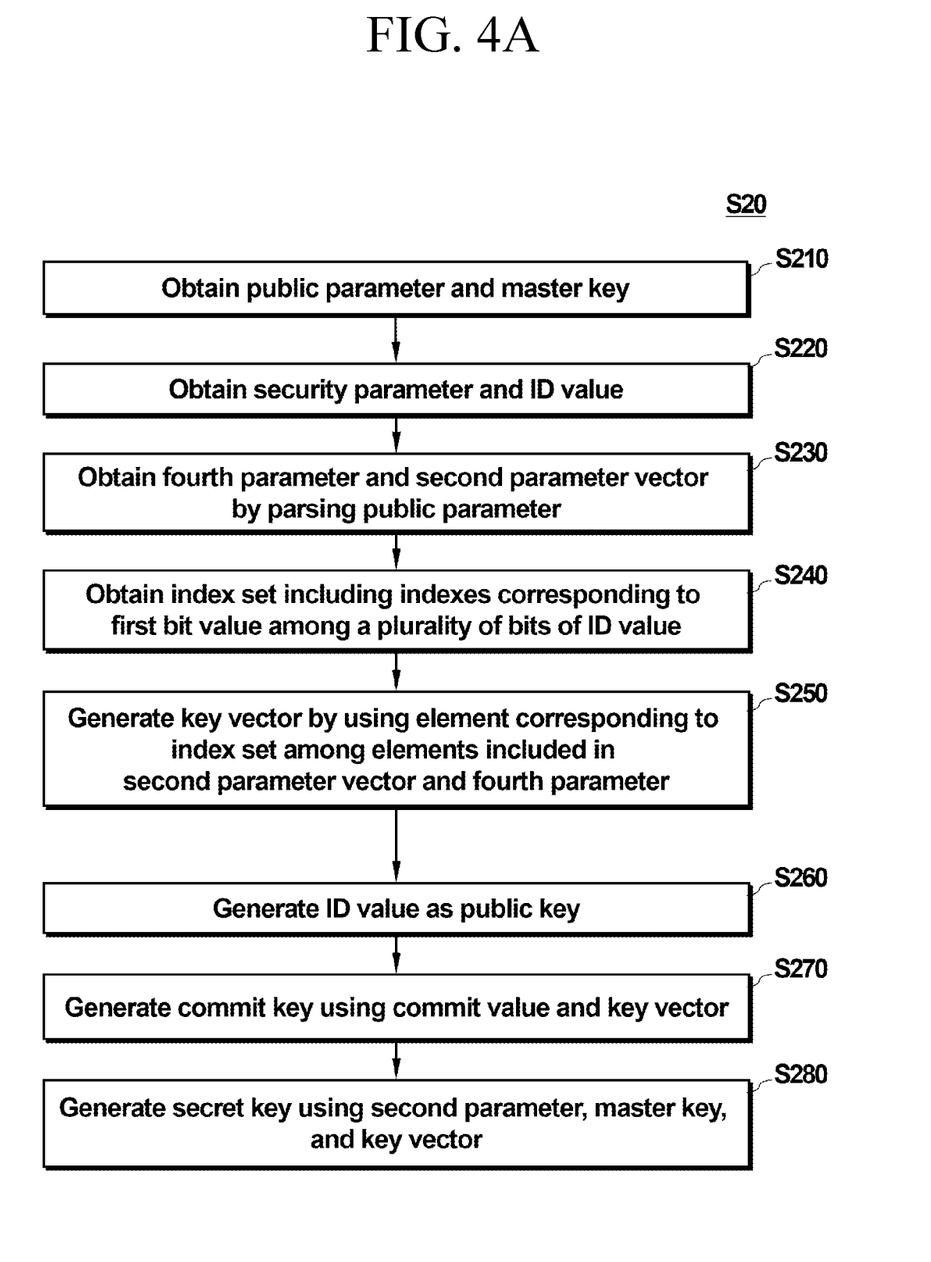
FIG. 4A is a flowchart illustrating a key generation step according to an example embodiment.
Figure 4B:
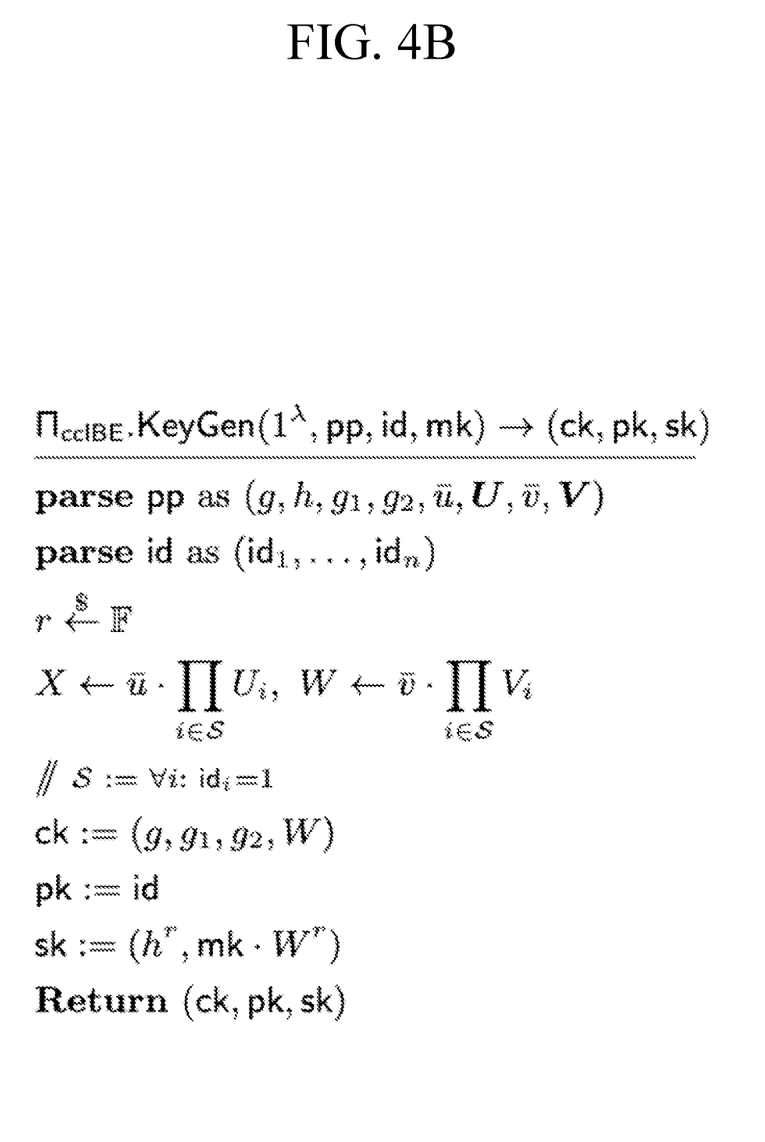
FIG. 4B is a diagram illustrating a key generation algorithm according to an example embodiment.

FIG. 4A is a flowchart illustrating a key generation step S20 according to an example embodiment, and FIG. 4B is a diagram illustrating a key generation algorithm according to an example embodiment.

Referring to FIGS. 4A and 4B, the key generator 100 may obtain a public parameter pp and a master key mk, step S210. Also, the key generator 100 may obtain a security parameter $1^\lambda$ and an ID value id, step S220. In one example, the key generator 100 may receive the public parameter pp and the master key mk from the authenticator, and may receive the security parameter $1^\lambda$ and the ID value id from the user.

The key generator 100 may obtain the fourth parameter v and the second parameter vector V by parsing the public parameter pp, S230. The key generator 100 may obtain an index set S including indexes corresponding to a first bit value (for example, any one of "1" or "0") among a plurality of bits of the ID value id, step S240. In one example, when the ID value id is "1010", the indexes having the first bit value "1" may be "0" (first "1") and "2" (third "1"), and the index set may be configured of "0" and "2".

The key generator 100 may generate a key vector W by using the element corresponding to the index set among the elements included in the second parameter vector V and the fourth parameter $\bar{v}$, step S250. In one example, the key generator 100 may generate the key vector W according to the equation shown in FIG. 4B.

The key generator 100 may generate an ID value id as a public key pk, step S260. Further, the key generator 100 may generate the commit key ck using the commit values $g_1$, $g_2$ and the key vector W, step S270, and in an embodiment, the key generator 100 may generate the first parameter g, the first commit value $g_1$, the second commit value $g_2$ and the key vector W as the commit key ck as shown in FIG. 4B.

The key generator 100 may generate a secret key sk using the second parameter h, the master key mk, and the key vector W, step S280, and in an embodiment, the key generator 100 may generate the second parameter exponentiated by the random constant r H', and multiplication of the master key mk and the key vector W exponentiated by the random constant r mk·Wr, as the secret key sk, as shown in FIG. 4B.

According to an embodiment of the present disclosure, convenience of an encryption algorithm may be embodied by generating a public key pk and a key vector W based on an ID value id.

Figure 5A:
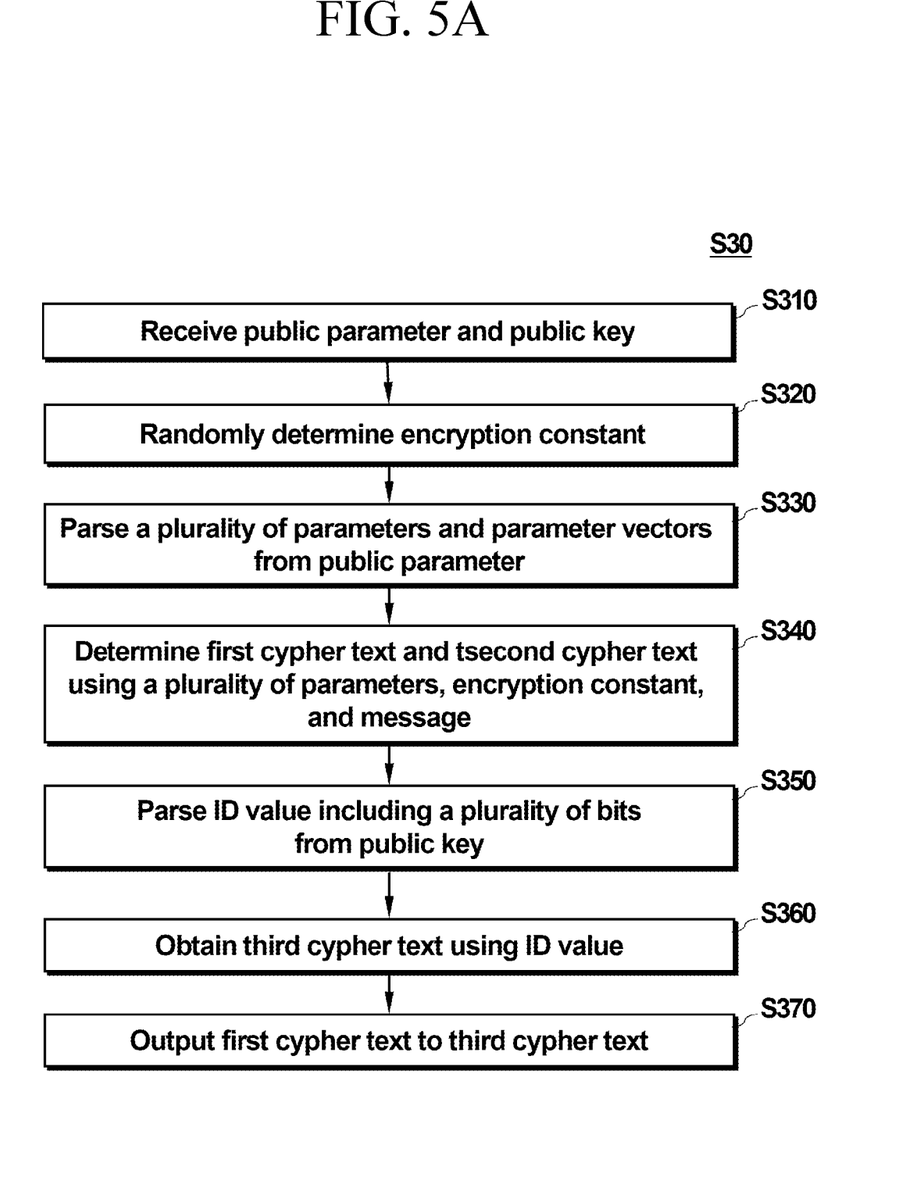
FIG. 5A is a flowchart illustrating an encryption step according to an example embodiment.
Figure 5B:
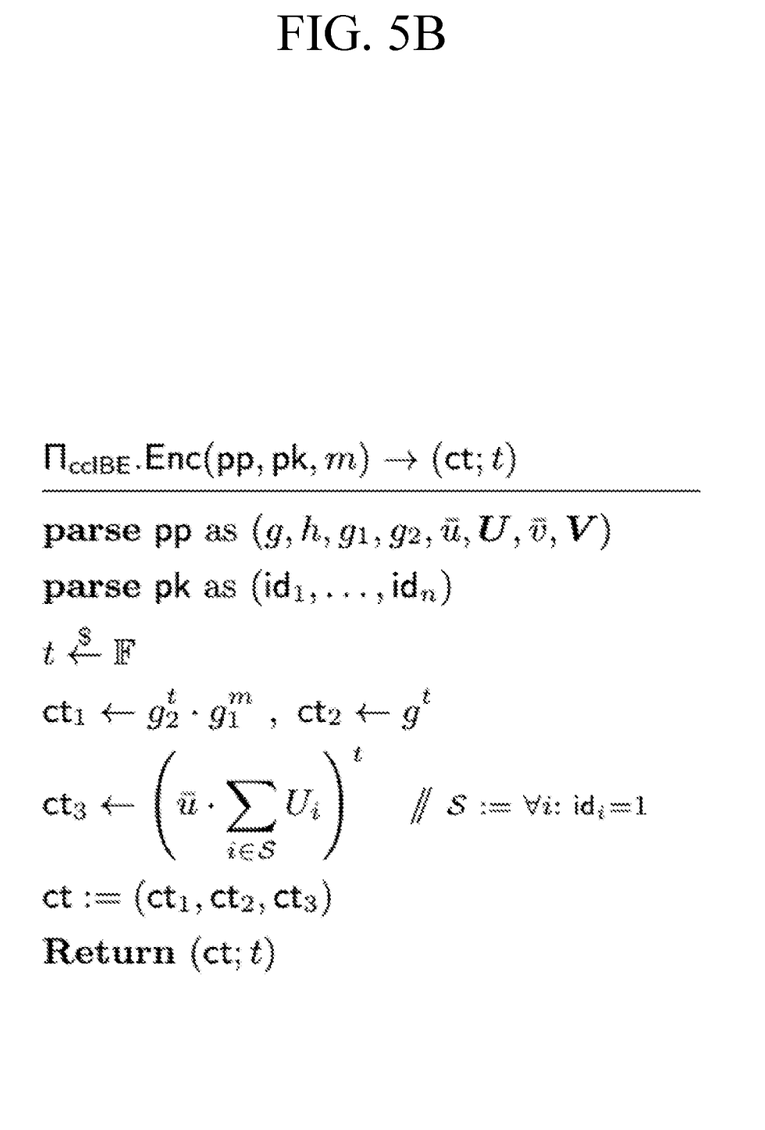
FIG. 5B is a diagram illustrating an encryption algorithm according to an example embodiment.

FIG. 5A is a flowchart illustrating an encryption step S30 according to an example embodiment, and FIG. 5B is a diagram illustrating an encryption algorithm according to an example embodiment.

Referring to FIGS. 5A and 5B, the encryptor 200 may receive a public parameter pp and a public key pk, step S310, and may randomly determine an encryption constant t, step S320. The encryptor 200 may parse a plurality of parameters and parameter vectors from the public parameter pp, step S330. The encryptor 200 may determine the first cypher text $ct_1$ and the second cypher text $ct_2$ using the plurality of parameters, the encryption constant t, and the message m, step S340.

In an embodiment, the encryptor 200 may determine a value obtained by multiplying a value of a first parameter g exponentiated by the message m and a value of a second parameter h exponentiated by the encryption constant t as the first cypher text $ct_1$, and may determine a value of the first commit value $g_1$ exponentiated by the encryption constant t as the second cypher text $ct_2$. In one example, the encryptor 200 may determine the first cypher text $ct_1$ and the second cypher text $ct_2$ based on Equation 1 below.

$$ct_1 = g_1^m \cdot g_2^t \qquad \text{[Equation 1]}$$
$$ct_2 = g^t$$

The encryptor 200 may parse the ID value id including a plurality of bits from the public key pk, step S350, and obtain the third cypher text $ct_3$ using the ID value id, step S360.

In an embodiment, the encryptor 200 may parse the third parameter u and the first parameter vector U from the public parameter pp, may obtain an index set S including indexes corresponding to a first bit value (e.g., "1") among the plurality of bits of the ID value id, and may determine the third cypher text $ct_3$ using elements corresponding to the index set among elements included in the first parameter vector U and the third parameter u. In one example, the encryptor 200 may determine the third cypher text $ct_3$ based on Equation 2 below.

$$ct_3 = \left(\overline{u} \cdot \sum_{i \in S} U_i\right)^t \quad \text{[Equation 2]}$$

The encryptor 200 may output the determined first cypher text $ct_1$ to third cypher text $ct_3$, step S370.

Figure 6A:
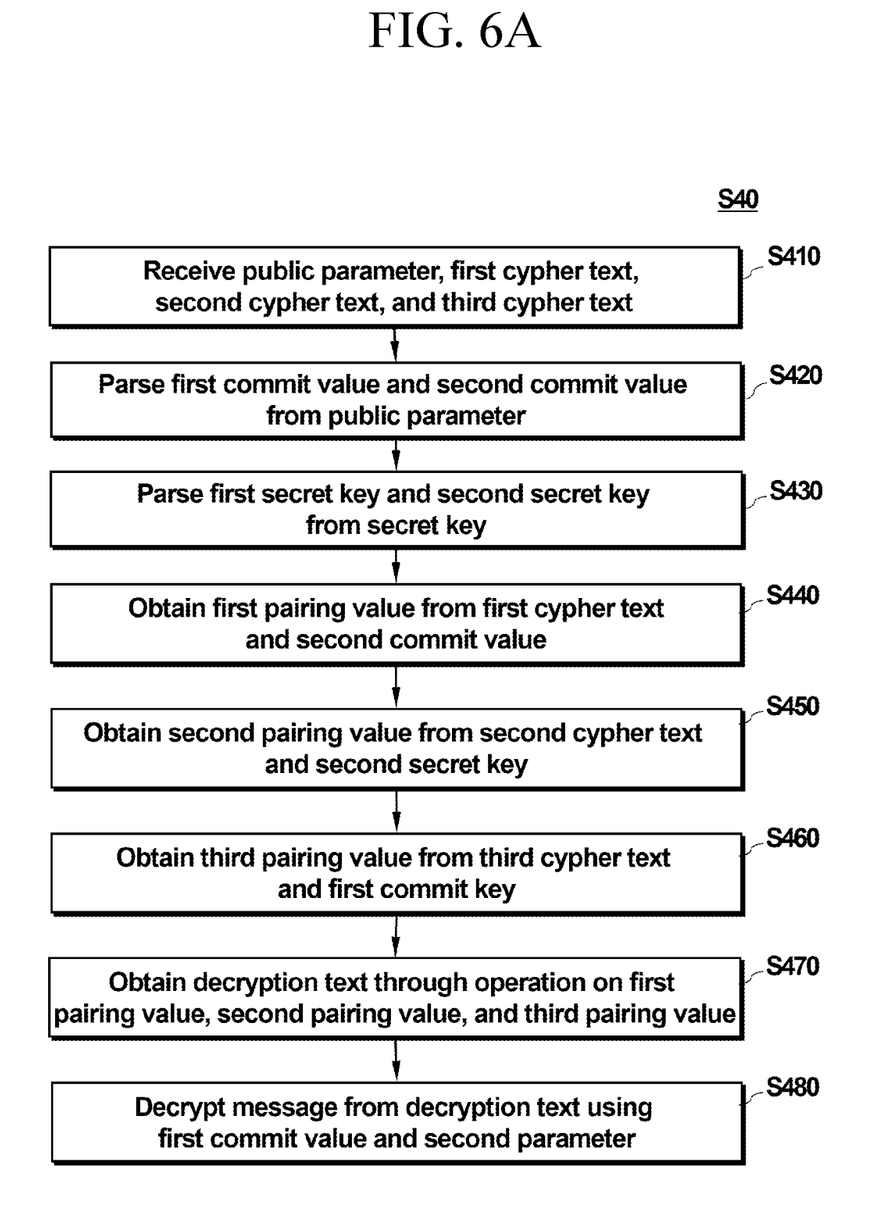
FIG. 6A is a flowchart illustrating a decryption step according to an example embodiment.
Figure 6B:
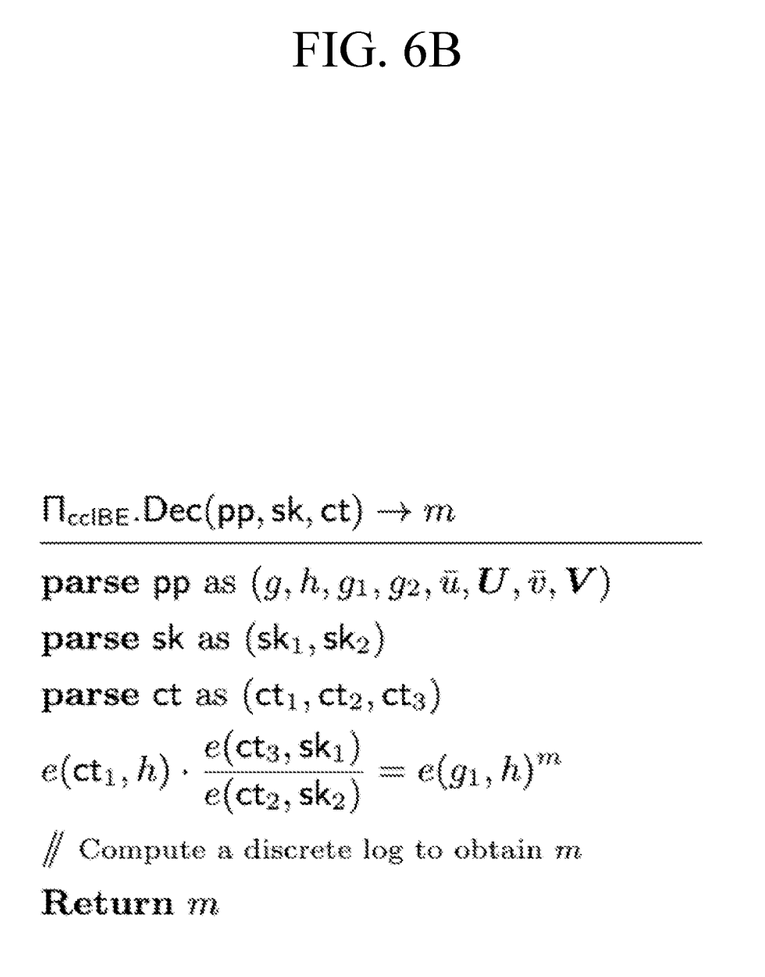
FIG. 6B is a diagram illustrating a decryption algorithm according to an example embodiment.

FIG. 6A is a flowchart illustrating a decryption step S40 according to an example embodiment, and FIG. 6B is a diagram illustrating a decryption algorithm according to an example embodiment.

Referring to FIGS. 6A and 6B, the decryptor 300 may receive the public parameter pp, the first cypher text $ct_1$, the second cypher text $ct_2$, and the third cypher text $ct_3$, step S410, and may parse the first commit value $g_1$ and the second commit value $g_2$ from the public parameter pp, step S420. Also, the decryptor 300 may parse the first secret key $sk_1$ and the second secret key $sk_2$ from the secret key sk, step S430.

The decryptor 300, using a pairing function, may obtain a first pairing value from the first cypher text $ct_1$ and the second commit value $g_2$, step S440, may obtain a second pairing value from the second cypher text $ct_2$ and the second secret key $sk_2$, step S450, and may obtain a third pairing value from the third cypher text $ct_3$ and the first commit key $g_1$, step S460. The pairing function means a process of uniquely encoding two values into one value, and in this specification, "e( )" is expressed as a pairing function.

The decryptor 300 may obtain a decryption text through an operation on the first pairing value, the second pairing value, and the third pairing value, step S470. In one example, the decryptor 300 may obtain a decryption text according to Equation 3 below.

$$e(ct_1, h) \cdot \frac{e(ct_3, sk_1)}{e(ct_2, sk_2)} \quad \text{[Equation 3]}$$

The decryptor 300 may decrypt the message m from the decryption text using the first commit value $g_1$ and the second parameter h, step S480. In an embodiment, the decryptor 300 may obtain a fourth pairing value with respect to the first commit value $g_1$ and the second parameter h by using a pairing function, and may determine, as the message m, an exponent value capable of achieving the decryption text through exponentiation of the fourth pairing value. In an embodiment, the decryptor 300 may determine the message m by discretely obtaining a log value of the fourth pairing value.

Referring to FIGS. 3B and 4B, the secret keys $sk_1$ and $sk_2$ may be expressed by Equation 4 below, and the verification of the decryption process using the properties of the pairing function may be proved by Equation 5 below.

$$sk_1 = h^r \quad \text{[Equation 4]}$$

$$sk_2 = h^{\alpha\beta} \cdot h^{r\gamma \cdot \Sigma_{i \in S} u_i}$$

$$e(ct_1, h) \cdot \frac{e(ct_3, sk_1)}{e(ct_2, sk_2)} = e(g^{\alpha\beta t} \cdot g^{\alpha m}, h) \cdot \frac{e(g^{t\gamma \cdot \Sigma \mu}, h^r)}{e(g^t, h^{\alpha\beta} \cdot h^{r\gamma \cdot \Sigma \mu})} \quad \text{[Equation 5]}$$

$$= e(g^{\alpha\beta t}, h) \cdot e(g^{\alpha m}, h) \cdot$$

$$\frac{e(g^{r\gamma \cdot \Sigma \mu}, h^r)}{e(g^t, h^{\alpha\beta}) \cdot e(g^t, h^{r\gamma \cdot \Sigma \mu})}$$

$$= e(g, h)^{\alpha\beta t} \cdot e(g^\alpha, h)^m \cdot$$

$$\frac{e(g, h)^{r t \gamma \cdot \Sigma \mu}}{e(g, h)^{\alpha\beta t} \cdot e(g, h)^{r t \gamma \cdot \Sigma \mu}}$$

$$= e(g^\alpha, h)^m = e(g_1, h)^m$$

Figure 7A:
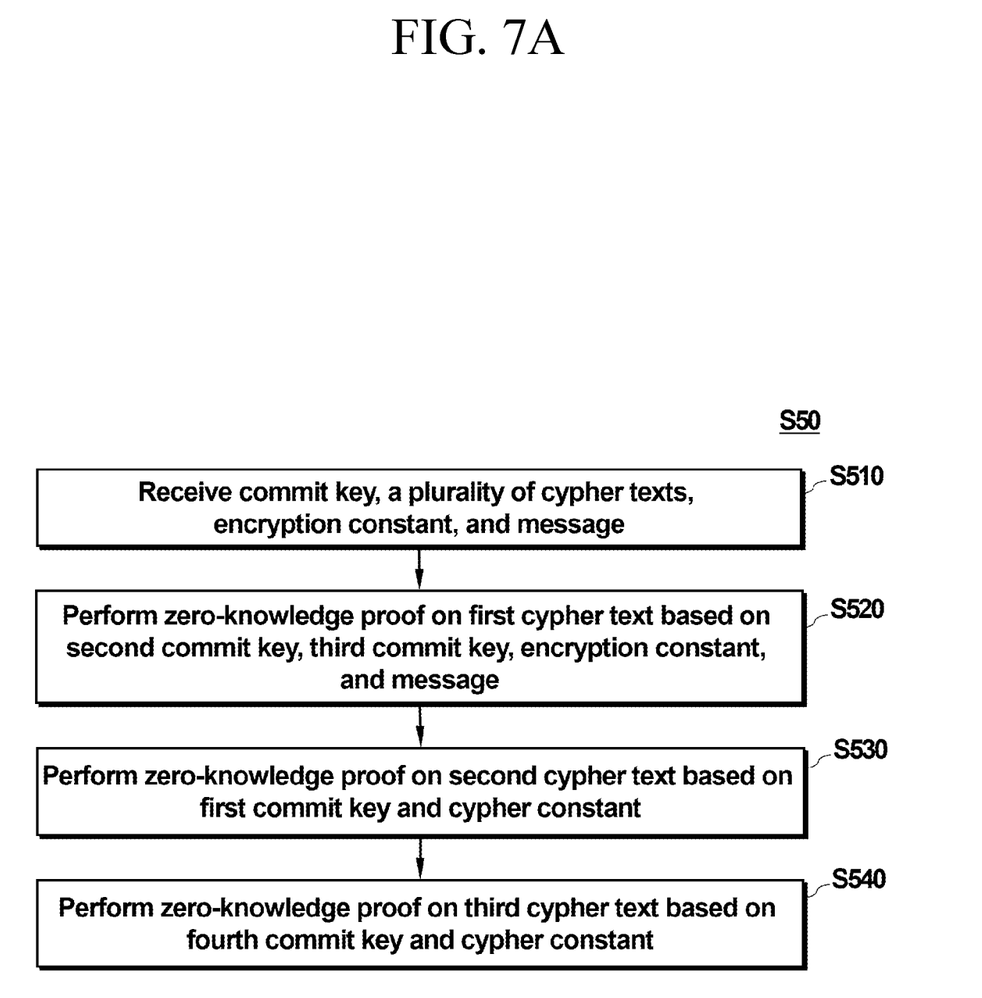
FIG. 7A is a flowchart illustrating a verification step according to an example embodiment.
Figure 7B:
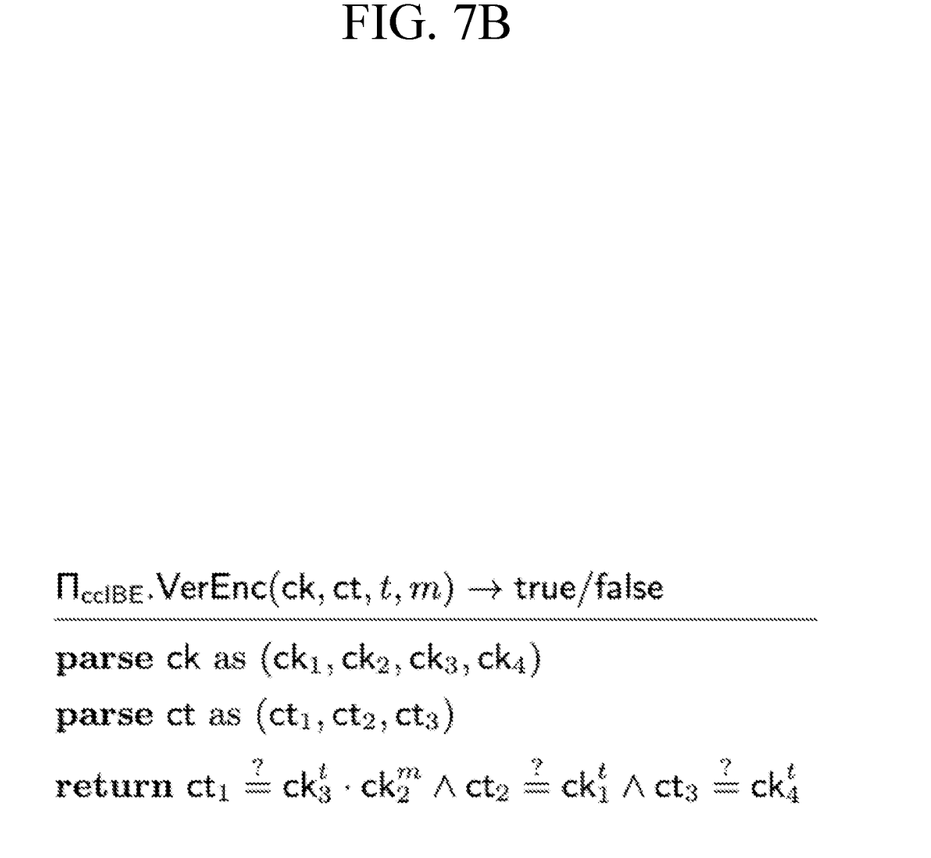
FIG. 7B is a diagram illustrating a verification algorithm according to an example embodiment.

FIG. 7A is a flowchart illustrating a verification step S50 according to an example embodiment, and FIG. 7B is a diagram illustrating a verification algorithm according to an example embodiment.

Referring to FIGS. 7A and 7B, the verifier 400 may receive a commit key ck, a plurality of cypher texts $ct_1$ to $ct_3$, an encryption constant t, and a message m, step S510. The verifier 400 may perform a zero-knowledge proof on the first cypher text $ct_1$ based on the second commit key $ck_2$, the third commit key $ck_3$, the encryption constant t, and the message m, step S520. In an embodiment, as illustrated in FIG. 7B, the verifier 400 may verify whether a value obtained by multiplying the second commit key $ck_2$ exponentiated by the message m and the third commit key $ck_3$ exponentiated by the encryption constant t is identical to the first cypher text $ct_1$, and may apply the verification result to the zero-knowledge algorithm to perform the zero-knowledge proof.

The verifier 400 may perform a zero-knowledge proof on the second cypher text $ct_2$ based on the first commit key $ck_1$ and the cypher constant t, step S530. In an embodiment, as illustrated in FIG. 7B, the verifier 400 may verify whether the first commit key $ck_1$ exponentiated by the encryption constant t is equal to the second cypher text $ct_2$, and may apply the verification result to the zero-knowledge algorithm to perform the zero-knowledge proof.

The verifier 400 may perform a zero-knowledge proof on the third cypher text $ct_3$ based on the fourth commit key $ck_4$ and the cypher constant t, step S540. In an embodiment, as illustrated in FIG. 7B, the verifier 400 may verify whether the fourth commit key $ck_4$ exponentiated by the encryption constant t is equal to the third cypher text $ct_3$, and may apply the verification result to the zero-knowledge algorithm to perform the zero-knowledge proof.

According to the exemplary embodiment of the present disclosure, the commit key ck is configured in the Pedersen commitment form, such that a high-speed cc-SNARK algorithm may be used when performing the zero-knowledge proof, and as a result, the verification process may be rapidly performed.

Figure 8:
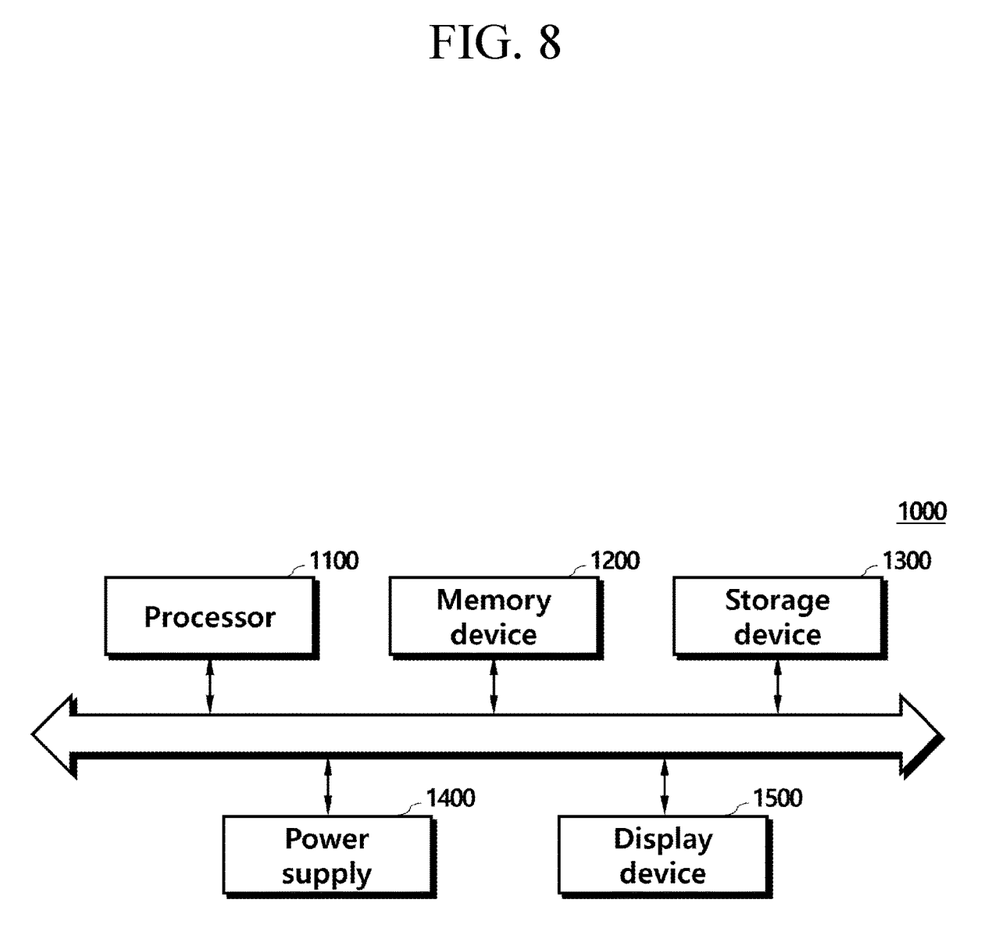
FIG. 8 is a block diagram illustrating a computing system according to an example embodiment.

FIG. 8 is a block diagram illustrating a computing system according to an example embodiment.

Referring to FIG. 8, a computing system 1000 may constitute one of at least one feature 100, 200, 300, and 400 constituting the system 10, and may include a processor 1100, a memory device 1200, a storage device 1300, a power supply 1400, and a display device 1500. Although not illustrated in FIG. 8, the computing system 1000 may further include ports for communicating with a video card, a sound card, a memory card, a universal serial bus (USB) device, other electronic devices, etc.

As described above, the processor 1100, the memory device 1200, the storage device 1300, the power supply 1400, and the display device 1500 included in the computing system 1000 may perform encryption, decryption, and verification methods according to embodiments of the inventive concept. In detail, the processor 1100 may perform the encryption, decryption, and verification methods described with reference to FIGS. 1 to 7B by controlling the memory device 1200, the storage device 1300, the power supply 1400, and the display device 1500.

The processor 1100 may perform various tasks or calculations. The processor 1100 may be a microprocessor or a Central Processing Unit (CPU). The processor 1100 may communicate with the memory device 1200, the storage device 1300, and the display device 1500 through a bus such as an address bus, a control bus, or a data bus. According to an embodiment, the processor 1100 may be connected to an expansion bus such as a Peripheral Component Interconnect (PCI) bus.

The memory device 1200 may store data necessary for an operation of the computing system 1000. For example, the memory device 1200 may be implemented as a DRAM, a mobile DRAM, an SRAM, a PRAM, an FRAM, an RRAM, and/or an MRAM. The storage device 1300 may include a solid state drive, a hard disk drive, a CD-ROM, etc. The storage device 1300 may store programs, application program data, system data, operating system data, etc., related to encryption, decryption, and verification methods described above with reference to FIGS. 1 to 7B.

The display device 1500 is an output means for performing a notification to a user, and may display and notify various types of information described in the present specification to a user or the like. The power supply 1400 may supply an operating voltage required for an operation of the computing system 1000.

According to the technical idea of the present invention, the encryption may be performed based on identification by using the Pedersen commitment, the encryption may be proved by using a zero-knowledge proof algorithm, and the encryption may be efficiently performed while the time for proving the cypher text is shortened by using the Pedersen commitment.

Exemplary embodiments have been invented in the drawings and specification as described above. Although the embodiments are described using specific terms in the specification, they are used only for the purpose of describing the technical spirit of the present invention and are not used to limit the meaning or the scope of the present invention described in Claims. Therefore, those skilled in the art will understand that various modifications and other equivalent embodiments are possible therefrom. Therefore, the true technical protection scope of the present invention should be determined by the technical spirit of the appended claims.

This work (Patent) was supported by Institute of Information & communications Technology Planning & Evaluation (IITP) grant funded by the Korea Government (MSIT) (No. 2021-0-00532-003, Project Name: Blockchain Technology Development for IITP Data Economy, Task Name: Blockchain scalability solutions supporting high performance/capacity transactions, Contribution Rate: 100%)

What is claimed is:

1. An encryption method of a message based on identification performed by at least one processor, the encryption method comprising:
receiving a public parameter and a public key;
randomly determining an encryption constant;
parsing a plurality of parameters from the public parameter;
obtaining a first cypher text by using a first commit value and a second commit value, the encryption constant, and the message;
obtaining a second cypher text by using the plurality of parameters and the encryption constant;
parsing an identification (ID) value including a plurality of bits from the public key;
obtaining a third cypher text by using the ID value; and
outputting the first cypher text, the second cypher text, and the third cypher text,
wherein at least one of the first cypher text, the second cypher text, and the third cypher text has a Pedersen commitment format,
wherein the obtaining the third cypher text comprises:
parsing a third parameter and a parameter vector from the public parameter;
obtaining an index set including indexes corresponding to a first bit value among a plurality of bits of the ID value; and
obtaining the third cypher text by using elements corresponding to the index set among elements included in the parameter vector and the third parameter,
wherein when the third parameter is $\bar{u}$, the parameter vector is U, the index set is S, and the encryption constant is t, the third cypher text $ct_3$ is determined by the following equation $$ct_3 = \left(\bar{u} \cdot \sum_{i \in S} U_i\right)^t.$$

2. The encryption method of claim 1, wherein the obtaining the first cypher text comprises determining, among the plurality of parameters, a value obtained by multiplying a value of the first commit value exponentiated by the message and a value of the second commit value exponentiated by the encryption constant as the first cypher text.

3. The encryption method of claim 2, wherein when the first commit value is $g_1$, the second commit value is $g_2$, the message is m, and the encryption constant is t, the first cypher text $ct_1$ is determined by the following equation $$ct_1 = g_1^m \cdot g_2^t.$$

4. The encryption method of claim 1, wherein the obtaining the second cypher text comprises determining, among the plurality of parameters, a value of a first parameter of the plurality of parameters exponentiated by the encryption constant as the second cypher text.

5. The encryption method of claim 4, wherein when the first parameter is g and the encryption constant is t, the second cypher text $ct_2$ is determined by the following equation.

$$ct_2 = g^t$$

* * * * *